W. M. ROSS.
COMBINED RAKE AND HARROW.
APPLICATION FILED JAN. 21, 1910.
966,602.
Patented Aug. 9, 1910.
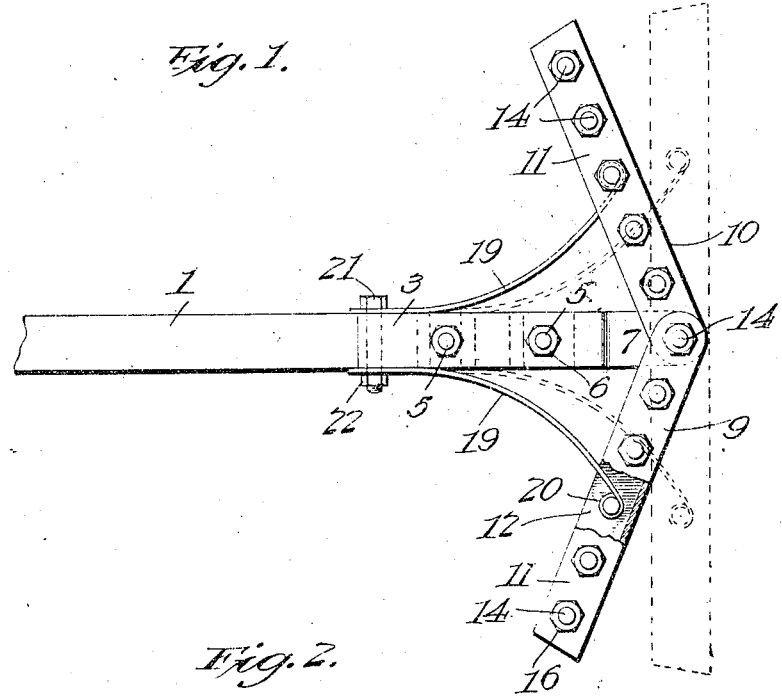
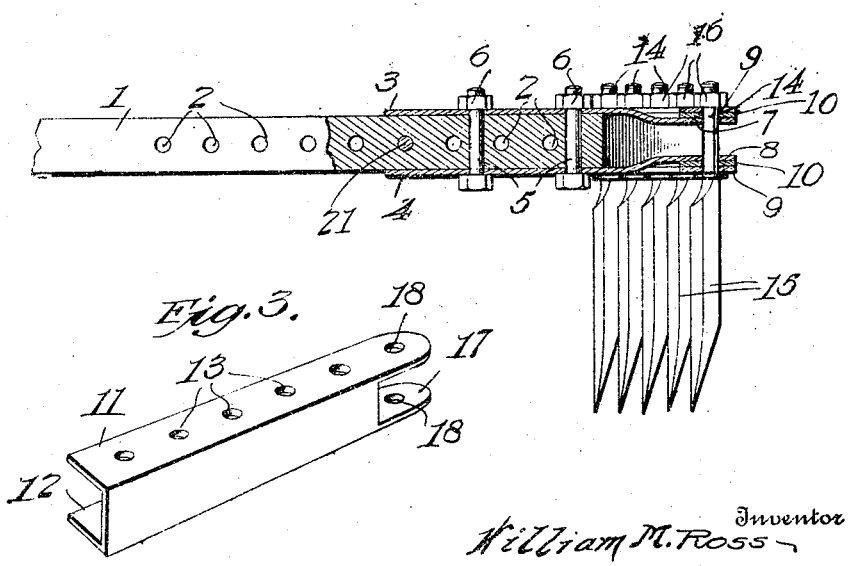

UNITED STATES PATENT OFFICE.

WILLIAM M. ROSS, OF GUTHRIE, TEXAS.

COMBINED RAKE AND HARROW.

966,602.

Specification of Letters Patent. Patented Aug. 9, 1910.

Application filed January 21, 1910. Serial No. 539,220.

*To all whom it may concern:*

Be it known that I, WILLIAM M. ROSS, a citizen of the United States of America, residing at Guthrie, in the county of King and State of Texas, have invented certain new and useful Improvements in Combined Rakes and Harrows, of which the following is a specification, reference being had therein to the accompanying drawing.

This invention relates to agricultural implements or machines and the principal object of the same is to provide a device of the character described which may be either used as a rake or a harrow, said device being provided with a pair of pivotally mounted tooth bars which may be adjusted to various angular positions relative to the supporting bar or handle.

In carrying out the object of the invention generally stated above it will be understood, of course, that the principal objects of the same are necessarily susceptible of changes in detail and structural arrangements, one preferred and practical embodiment of which is shown in the accompanying drawings, wherein:—

Figure 1 is a top plan view of the improved agricultural implement, shown partly in section, and the supporting bar or handle being broken away. Fig. 2 is a part side elevation and a part vertical sectional view thereof. Fig. 3 is a detail perspective view of one of the tooth bars.

Referring to the accompanying drawings by numerals, 1 designates the supporting bar or handle of the improved implement, which is preferably rectangular shaped in cross section, and which has one end portion provided with regularly spaced apart horizontally extending openings 2. A pair of straps 3—4 are provided, respectively for the top and bottom of the end portion of the handle 1 that is provided with the transverse openings 2, said strap being rigidly but detachably held in engagement with said handle by bolts 5 and nuts 6. The outer ends of said straps project well beyond the end of handle 1 and are bent inwardly and toward each other to provide upper and lower pivot ears 7—8.

A pair of tooth bars 9—10 are employed in connection with the improved implements. Said tooth bars are of duplicate construction each being formed of channeled iron to provide the upper and lower flanges 11—12 respectively, which are provided with regularly spaced apart transverse openings 13 for the passage of the shanks 14 of the teeth 15. Said shanks have their free ends threaded so that they may be rigidly but detachably fastened to the tooth bars by the lock nuts 16. At one end of the tooth bars 9—10 the flanges are projected outwardly to provide pivot ears 17. each ear being provided with an opening 18, and the ears of one bar being preferably bent toward each other so that the ears of the other bar may be fitted over them.

In assembling the parts of the invention just described the tooth bars are fitted together with their end ears in overlapping relation, and the pivot ears of the handle strap 3—4 are inclosed by said overlapping ears, the shank 14 of the center tooth is passed through the alined openings of said ears to hold the bars and straps in pivotal relation.

Brace arms 19 extend from each side of the handle 1, one end of said bars being coiled about the shank 14 of one tooth, the other end of each arm being mounted on an adjustable bolt 21 that is selectively engaged with one of the openings 2 of the handle 1 and may be locked in said selective position by means of the end nut 22.

As will be obvious the angular positions of the tooth bars may be shifted by moving the bolt 21 from one hole to another, such shifting of the bars being indicated by dotted lines in Fig. 1.

As will be readily understood from the foregoing the parts of the invention are held in position in such manner that they may be readily separated when necessary or desirable. And it will also be seen that teeth 15 are preferably provided with a longitudinal extending cutting edge at their forward portion which facilitates the raking or digging operation of the teeth. It will also be understood that while in the foregoing the handle 1 has been referred to in a manner that would indicate that the implement is manually operated said handle may in reality, be a tongue or pole to which draft animals may be attached.

What I claim as my invention is:—

1. A device of the character described comprising a handle, pivot ears projecting from one end thereof, a pair of tooth bars provided with end ears arranged in overlapping relation and engaged with the pivot ears of said handle, teeth carried by said bars, and brace arms having one of their ends adjustably fastened to said handle and their other ends being connected to said tooth bars.

2. A device of the character described comprising a handle, a pair of tooth bars having pivot ears at one end pivotally connected to said handle, teeth carried by said bars, and a pair of brace arms having one of their ends adjustably connected to said handle, the other ends of said arm being fastened to one tooth of each bar.

3. A device of the character described comprising a handle, a pair of pivot ears projecting from one end of said handle, a pair of tooth bars formed of channeled iron and having one end provided with outwardly projecting ears, the ears of said bars being adapted for overlapping engagement, means for pivotally connecting said overlapped ears to the projecting ears of said handle, teeth carried by said bars, and means for adjustably connecting the free end portion of said bars to said handle.

4. A device of the character described comprising a handle, a strap projecting from the upper and lower side of said handle, said straps terminating in pivot ears, a pair of tooth bars provided with end ears arranged in overlapped relation and pivotally connected to the ears of said straps, teeth carried by said bars, and adjustable bracing means connecting said bars to said handle to vary the positions of said bars relatively to said handle.

In testimony whereof I hereunto affix my signature in presence of two witnesses.

WILLIAM M. ROSS.

Witnesses:
    Tead. R. Davis,
    J. A. Franklin.